United States Patent [19]

Mixer

[11] Patent Number: 5,730,232
[45] Date of Patent: Mar. 24, 1998

[54] TWO-SPEED FASTENER DRIVER

[76] Inventor: John E. Mixer, 13591 Aquilla Rd., Chardon, Ohio 44024

[21] Appl. No.: 631,307

[22] Filed: Apr. 10, 1996

[51] Int. Cl.$^6$ .................................................. B23B 23/14
[52] U.S. Cl. .......................... 173/176; 173/178; 173/216
[58] Field of Search ............................. 173/176, 178, 173/216, 218

[56] References Cited

U.S. PATENT DOCUMENTS

| | | | |
|---|---|---|---|
| 3,319,494 | 5/1967 | Ulbing | 475/12 |
| 3,586,115 | 6/1971 | Amtsberg | 173/33 |
| 3,589,489 | 6/1971 | Fehlings | 192/139 |
| 4,147,219 | 4/1979 | Wallace | 173/178 |
| 4,328,871 | 5/1982 | Gluskin | 173/178 |
| 4,554,980 | 11/1985 | Doniwa | 173/176 |
| 4,650,007 | 3/1987 | Fujita et al. | 173/178 |
| 4,834,192 | 5/1989 | Hansson | 173/178 |
| 4,881,435 | 11/1989 | Hansson | 81/469 |
| 4,892,013 | 1/1990 | Satoh | 173/178 |
| 5,203,242 | 4/1993 | Hansson | 81/469 |
| 5,339,908 | 8/1994 | Yokota et al. | 173/216 |

*Primary Examiner*—Scott A. Smith
*Attorney, Agent, or Firm*—Fay Sharpe Beall Fagan Minnich & McKee

[57] ABSTRACT

A two-speed fastener driving tool includes a reversible rotary motor including means to reverse, having an output shaft connected in axial alignment with a tool driving output shaft by an improved drive assembly comprising a first overrunning clutch axially aligned with the motor output shaft for providing a high speed drive connection with the tool driving output shaft when the motor is rotated in a first direction. A second overrunning clutch surrounds the first overrunning clutch and functions for providing a low speed drive connection with the tool driving output shaft when the motor is rotated in a direction opposite to the first direction.

11 Claims, 3 Drawing Sheets

TWO-SPEED FASTENER DRIVER

BACKGROUND OF THE INVENTION

The subject invention is directed to the art of power tools and, more particularly, to a two-speed fastener driving tool.

In installing threaded fasteners such as bolts, nuts, and the like, it is often required that the bolt or nut be rotated at a relatively low torque for numerous revolutions until mating is accomplished. Thereafter, the bolt or nut must be rotated a small number of revolutions at progressively higher torque until the final installed torque is reached. As can be appreciated, the low torque running time is lost, non-productive time in the operation cycle.

Various prior art devices and tools have been proposed to allow the low torque operation to be at high speed while the final high torque operation is at a somewhat lower speed. Numerous devices have bene proposed and are shown, for example, in the following U.S. Pat. Nos.: ULBING-3,319,494; AMTSBERG, ET AL.-3,586,115; FEHLINGS-3,589,489; GLUSKIN-4,328,871; HANSSON-4,881,435; and, HANSSON-5,203,242.

These prior art devices, while generally satisfactory in certain aspects, have been less that totally adequate and have suffered from a variety of defects. Accordingly, there is a need for an improved and more efficient fastener driving tool which can run at high speed during low torque operation and then run at a low speed and high torque output until the desired final park level is reached.

SUMMARY OF THE INVENTION

The subject invention provides a two-speed driver of the general type discussed above wherein all drive splines in gears remain engaged throughout the entire operation even while shifting from low torque, high speed operation to high torque, low speed operation.

In accordance with one aspect of the invention, there is provided a fastener driving tool including a reversible rotary motor having an output shaft connected in axial alignment with a tool driving output shaft by improved drive means. The drive means comprising a first overrunning clutch means axially aligned with the motor output shaft for providing a high speed drive connection with the tool driving output shaft when the motor is rotated in a first direction. A second overrunning clutch means is mounted in surrounding relationship to the first overrunning clutch means for providing a low speed drive connection with the tool driving output shaft when the motor is rotated in a direction opposite to the first direction.

Preferably, a first planetary gear means is drivingly connected between the output shaft of the rotary motor and the first overrunning clutch means and a second planetary gear means is drivingly connected between the first overrunning clutch means and the tool driving output shaft.

The above described arrangement permits the tool to have a very compact construction and allows the first and second planetary gear means to be continuously engaged whenever the motor is rotated. The constant engagement of the various gears increases their life and makes for simpler operation.

In accordance with a more limited aspect of the invention, the second overrunning clutch means includes pivotally mounted latch means mounted on a carrier member that drives said second planetary gear means. The carrier member also constitutes a component of the first overrunning clutch means.

As can be seen from the foregoing, a primary object of the invention is the provision of a tool of the type described that can be formed as a compact and efficient assembly to allow shifting from high speed, low torque operation to low speed, high torque operation without requiring gear or spline disengagement.

A further object of the invention is the provision of a fastener driving tool which allows shifting between low speed, high torque and high speed, low torque operation to be accomplished merely by reversing the direction of motor operation.

Another object of the invention is the provision of a two-speed fastener driving tool that does not require any special speed change gearing.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

DETAILED DESCRIPTION OF THE PREFERRED EMBODIMENT

Figure 1:
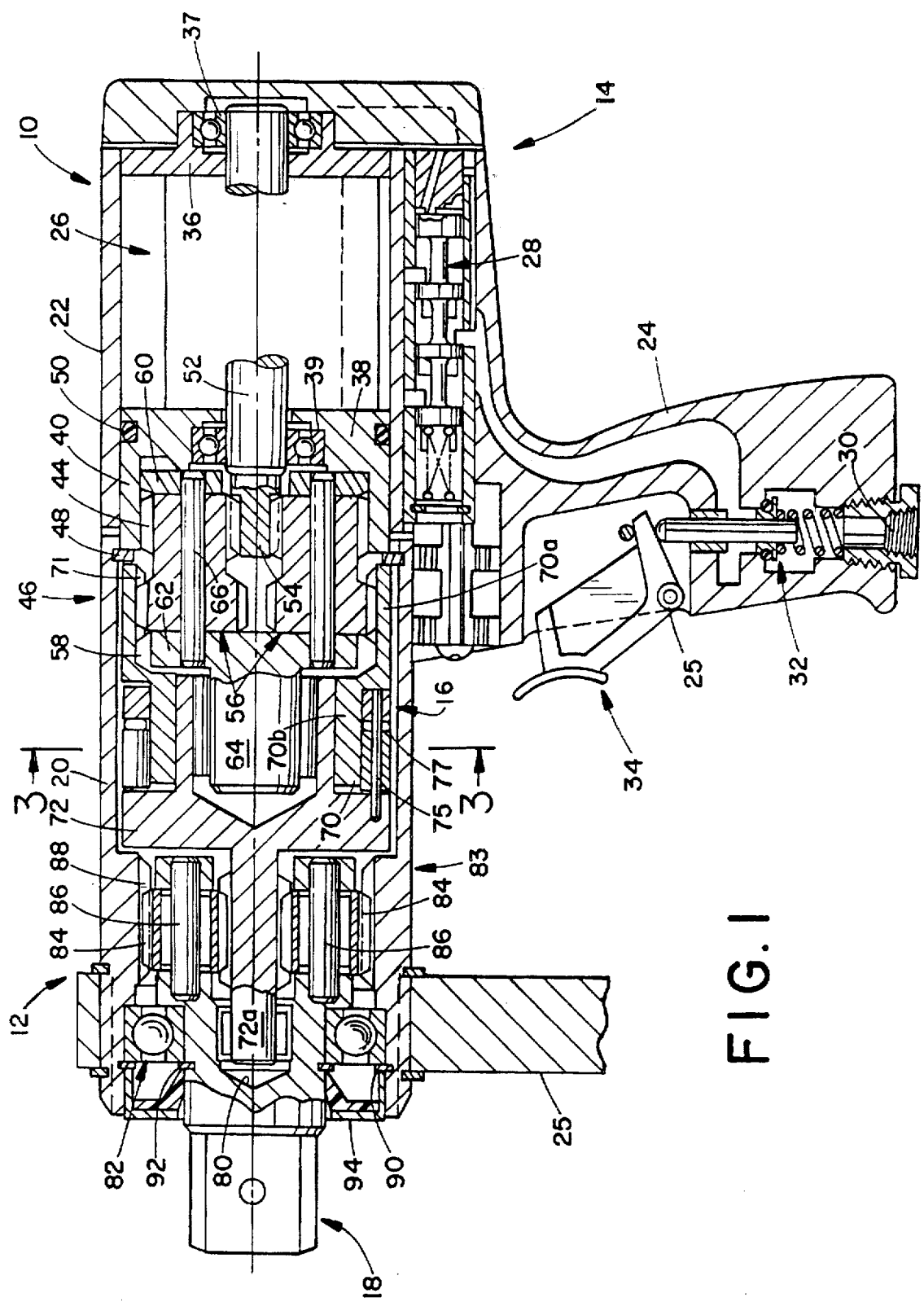
FIG. 1 is a longitudinal cross-sectional view through a power tool intended for two-speed tightening of screw joints that is formed in accordance with the preferred embodiment of the subject invention.

Referring now to the drawings wherein the showings are for the purposes of illustrating the preferred embodiment of the invention only and not for purposes of limiting same, FIGS. 1 through 4 illustrate the overall construction and arrangement of a two-speed fastener driver 10 comprising a housing 12 carrying a reversible motor unit 14 that is connected through an inventive overrunning clutch and gearing system 16 with an output spindle or shaft 18. The tool is arranged so that it is possible to select either high speed, low torque output or low speed, high torque output merely by manually or automatically reversing the direction of the motor 14.

The housing 12 could have a variety of specific constructions and could be formed from many different materials. In the subject embodiment, however, the housing is a multi-part housing formed from metal and comprising a forward gear chamber portion 20 and a rearward motor chamber housing portion 22 to which is connected a pistol grip handle 24. At the forward end of gear chamber portion 20, there is a reaction bar 25 to assist the user in absorbing or counter-acting torque generated by the tool during use. The various housing sections are suitably interconnected by tie bolts or the like to allow ready release for maintenance and repair.

The particular type of motor provided is not important to the invention and could be any conventional hydraulic, pneumatic, or electric motor that is capable of being selectively reversed in rotational direction. In the subject embodiment, a conventional air-operated rotary motor 26 that is supplied with air through a suitable standard slide valve assembly 28 that allows selective reversal of the direction of motor rotation. The pressure air is supplied to the valve 28 and the motor 26 through an input line 30 controlled by a standard spring-biased poppet valve assembly 32. Operation of the poppet valve 32 is through the use of a trigger 34 mounted for rotation about a pin 25 as can be readily understood and appreciated from FIG. 1.

Referring again to the motor 26, it will be seen that the motor is mounted between an outer end plate 36 and an inner plate or housing portion member 38. As shown, suitable bearings 37, 39 are carried within the respective plates 36, 38. The member 38 has a generally flat configuration. The interior of the sleeve portion 40 is provided with circumferentially continuous, internal gear teeth 44 which form the stationary outer gear of a planetary gearing assembly 46 and is suitably attached to item 38.

The positioning of the member 38 and 40 in an axial direction is controlled by an internal snap ring 48. Additionally, a seal 50 is provided circumferentially of member 38.

The output shaft 52 of motor 26 extends axially of the side wall 40 and includes a geared end portion 54 that has radially facing teeth aligned with and corresponding in shape and pitch to the gear teeth 44. The cooperation of the geared end 54 of output shaft 52 and the interior of the side wall 40 serve to drive the planetary gear assembly 46 that generally includes a pair of gear elements 56. The gear elements 56 include a small diameter gear portion 56a and an integral axially spaced, larger diameter gear portion 56b. The gear elements are suitably mounted on a gear carrier 58. The gear carrier 58 includes a first circular end plate 60 and a second, axially spaced end plate or carrier member 62 that includes a circular output shaft 64. Suitable axle members 66 are joined between end plate 60 and member 62 and support the orbital gears 56.

As can be appreciated, portions 56a of gears 56 are engaged between shaft 52 and gear teeth 44. Thus, rotation of the motor output shaft 52 causes driving rotation of the planetary gears 56 and the gear carrier 58 in either a clockwise or counterclockwise direction depending upon the direction of rotation of the motor output shaft 52.

Figure 2:
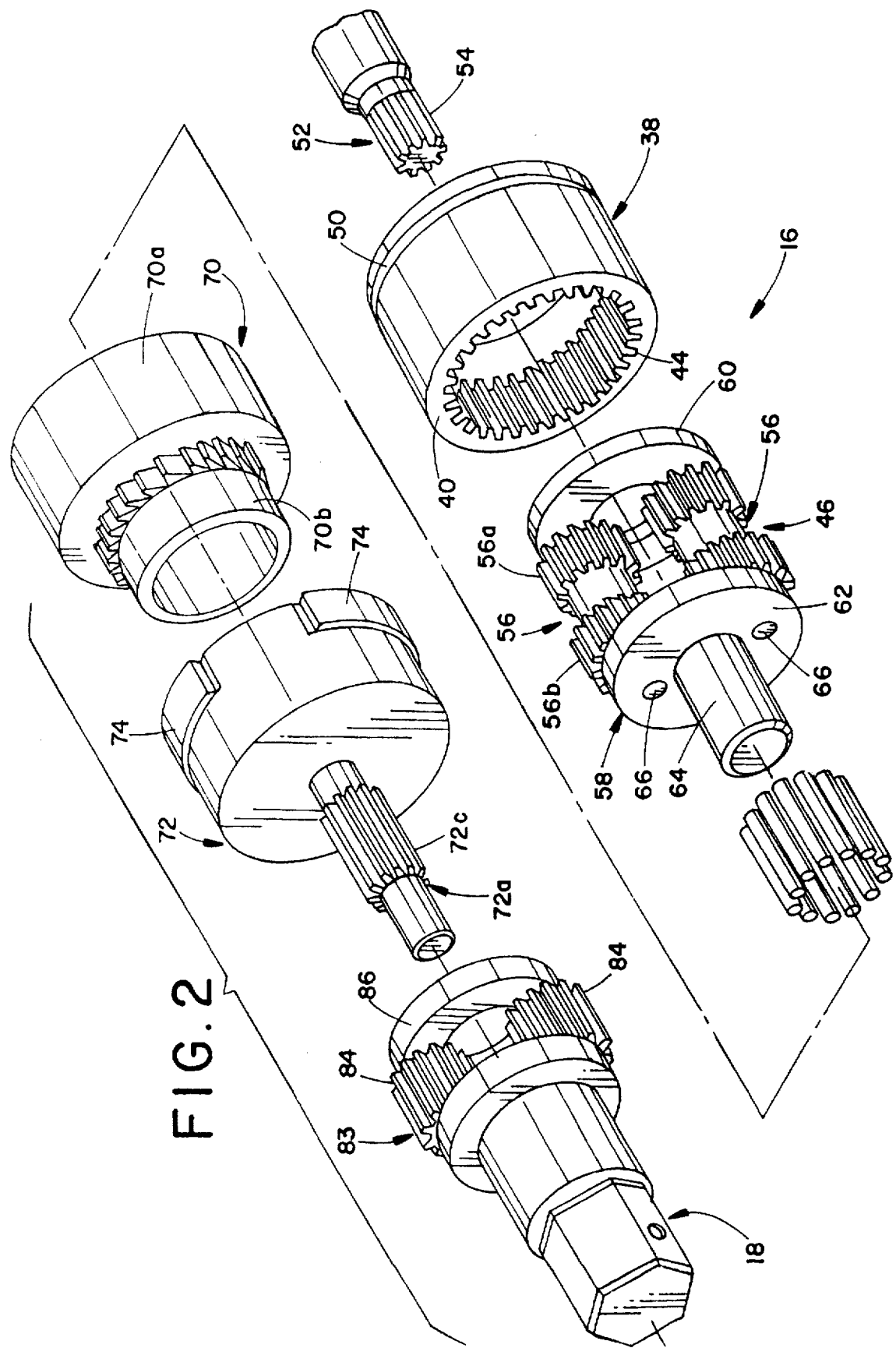
FIG. 2 is an exploded perspective view of the main components of the drive portion of the tool of FIG. 1; and, FIGS. 3 and 4 are cross-sectional views through the clutch portion of the tool (the views are taken on line 3—3 of FIG. 1).
Figure 3:
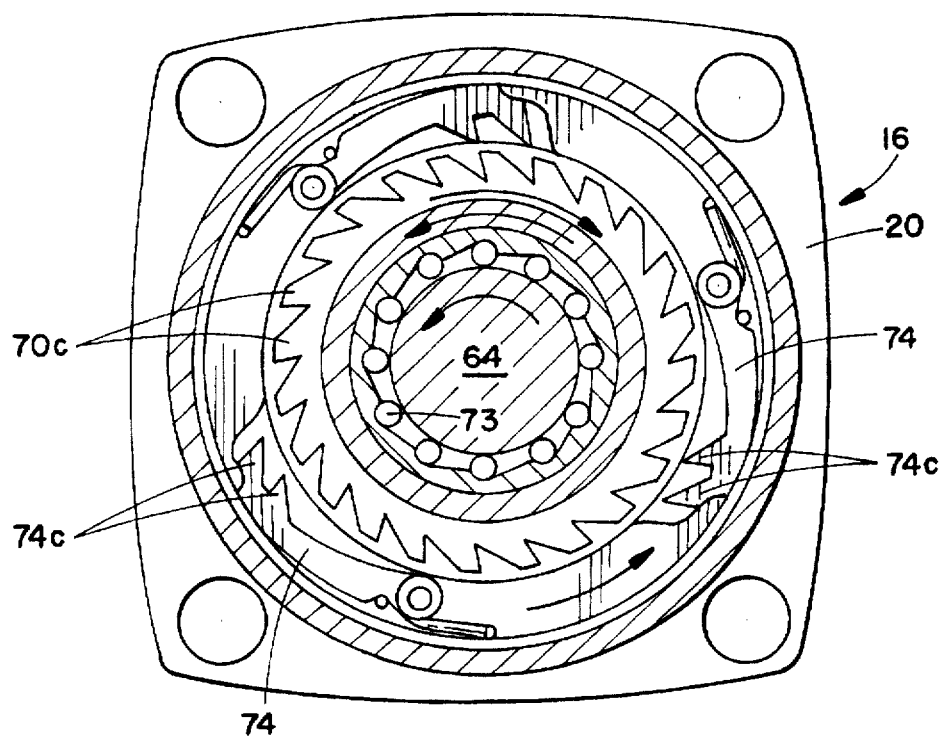
Figure 4:
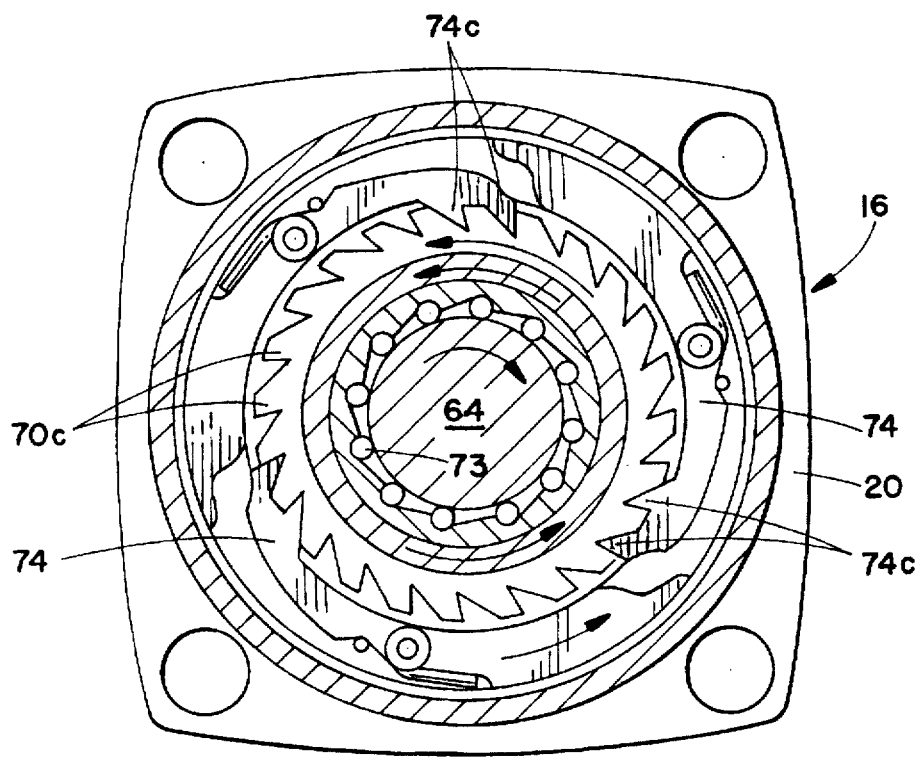

Of importance to the subject invention is the manner in which the output from the planetary gearing unit 58 is conducted to the output shaft 18 as either a high speed, low torque output or a low speed, high torque output as previously discussed. Basically, the low speed connection includes gearing member 70 that has a sleeve-like, stepped diameter configuration that includes a first, large diameter portion 70a having an interior circumferential gear 71 that is adapted to engage with the larger diameter gear portion 56b of the planetary gears 56. The element 70 is mounted for relative rotation within the housing and has its smaller diameter portion rotatably carried on the right-hand end of a pawl carrier element 72. The smaller diameter, left-hand end 70b of element 70 has suitable pawl teeth formed about its exterior as best seen in FIGS. 3 and 4. Arranged to selectively engage with these teeth 70c are three pawl arms 74 which are carried on suitable pivot pins 75 extending outwardly from the pawl carrier 72. The pawl arms 74 are continually biased toward a radial inner position (as illustrated in FIG. 2) by suitable coil springs 77 associated with pins 75 to cause their teeth 74c to engage with the pawl teeth 70c on portion 70b.

The interior surface of the right-hand end of pawl carrier 72 is contoured as best seen in FIGS. 3 and 4 and has a plurality of axially extending hardened roller elements 73 positioned therein as shown. The roller elements are mounted for engagement on the cylindrical outer surface of the reduced diameter drive end 64 of the planetary gearing assembly 58. The roller elements and the contoured inner surface of the right-hand pawl carrier 72 provide a first overrunning clutch means. Note that when drive end 64 is rotated in the direction shown in FIG. 4, the rollers move in a known manner to disengage from the reduced diameter portions of the contoured inner surface of the pawl carrier 72. Thus, there is no direct driving between drive end 64 and the carrier 72. When end 64 rotates in the direction shown in FIG. 3, however, the rollers 73 move to a direct engaged position with the reduced diameter portion and a direct drive connection results.

The combined cooperative functioning of the pawl arms 74 and the roller elements 73 will subsequently be described in some detail. For the present, however, it should be noted that the left-hand, reduced diameter end 72a of the pawl carrier 72 extends into and is supported by suitable needle bearings mounted within the internal bore 80 of the output shaft 18. The output shaft 18 is, of course, suitably mounted for rotation relative to the housing 18 by bearing 82. It should also be noted that the right-hand end of the output element 18 is provided with a second planetary gearing arrangement 83 having suitable gears 84 carried on pivot pins 86 extending from the right-hand end of the output shaft 18 into engagement in a carrier ring 86. The planetary gears 84 are driven by a geared exterior surface 72c on portion 72a of the pawl carrier 72. At their outer periphery, they engage with a fixed interior gear 88 formed on the interior of the housing component 20.

The previously-mentioned gear 82 is retained in position by suitable snap rings 90 and 92 positioned as shown. Additionally, a bearing seal element 94 seals the forward end of the housing while permitting free relative rotation of the output element 18.

With respect to the operation of the tool throughout a tightening cycle, assume that upon actuation of the motor through depression of the trigger 34 and supply of air through the reversing spool valve 28, the motor is caused to move in a counterclockwise direction as viewed from the left producing counterclockwise rotation of the output shaft 54 which, in turn, causes movement of the shaft 64 in a counterclockwise direction as seen in FIG. 3. Simultaneously, this produces engagement of the high speed, overrunning clutch means producing direct driving of the pawl carrier 72 in a counterclockwise direction. The high speed rotation of the pawl carrier causes the pawls, by virtue of centrifugal force, to be thrown radially outward against the bias of their actuating springs so that they assume the non-engaged position of FIG. 3. The counterclockwise movement as seen in FIG. 3 is, of course, transmitted through the gearing 84 to a counterclockwise movement of the output shaft 18. This results in high speed, low torque turning of the fastener driven by the output shaft 18 until it begins tightening. The motor reversing valve or switch 28 is operated (either manually or through a automatic sensing means) to reverse the motor and reverse the movement of the planetary gearing element 46 to rotate as shown in FIG. 4. This causes disengagement of the high speed clutch means. Thereafter, the pawls 74 engage producing a driving connection with the pawl carrier and the low speed gearing element 70. The lower speed, higher torque operation thus causes the pawl carrier to move at a lower speed in the counterclockwise direction as illustrated in FIG. 4. The final few turns of the fastener is thus accomplished at a significantly higher torque.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. In a fastener driving tool including a reversible rotary motor including a reversal means upon demand and having an output shaft connected in axial alignment with a tool driving output shaft by improved drive means, said improved drive means comprising a first overrunning clutch means axially aligned with the motor output shaft for providing a high speed drive connection with the tool driving output shaft when the motor is rotated in a first direction, and a second overrunning clutch means surrounding said first overrunning clutch means for providing a low speed drive connection with the tool driving output shaft when the motor is rotated in a direction opposite to the first direction.

2. A fastener driving tool as set forth in claim 1 including a first planetary gear means drivingly connected between the output shaft of the rotary motor and the first overrunning clutch means.

3. A fastener driving tool as set forth in claim 2 including a second planetary gear means drivingly connected between the first overrunning clutch means and the tool driving output shaft.

4. A fastener driving tool as set forth in claim 3 wherein said first and second planetary gear means are continuously engaged whenever said motor is rotated.

5. A fastener driving tool as set forth in claim 3 wherein said second overrunning clutch means includes pivotally mounted latch means on a carrier member that drives said second planetary gear means.

6. A fastener driving tool as set forth in claim 5 wherein said carrier member constitutes a component of said first overrunning clutch means.

7. A fastener driving tool including a reversible rotary motor having an output shaft connected in axial alignment with a tool driving output shaft by drive means comprising a first rotary overrunning clutch means axially aligned with the motor output shaft for providing a high speed drive connection with the tool driving output shaft when the motor is rotated in a first direction, and a second rotary overrunning clutch means mounted in surrounding relationship to said first rotary overrunning clutch means for providing a low speed drive connection with the tool driving output shaft when the motor is rotated in a direction opposite to the first direction; and, a first planetary gear means drivingly connected between the output shaft of the rotary motor and the first rotary overrunning clutch means.

8. A fastener driving tool as set forth in claim 7 including a second planetary gear means drivingly connected between the first rotary overrunning clutch means and the tool driving output shaft.

9. A fastener driving tool as set forth in claim 4 wherein said first and second planetary gear means are continuously engaged whenever said motor is rotated with said first planetary gear means producing continuous rotation of a first component of said second planetary gear means.

10. A fastener driving tool as set forth in claim 9 wherein said second overrunning clutch means includes a carrier member having pivotally mounted latch means that drive said second planetary gear means.

11. A fastener driving tool as set forth in claim 10 wherein said carrier member further constitutes a component of said first overrunning clutch means.

* * * * *